Nov. 30, 1965   W. E. FREETH ETAL   3,221,136
METHOD AND ELECTRODE FOR ELECTRIC ARC WELDING
Original Filed May 27, 1957
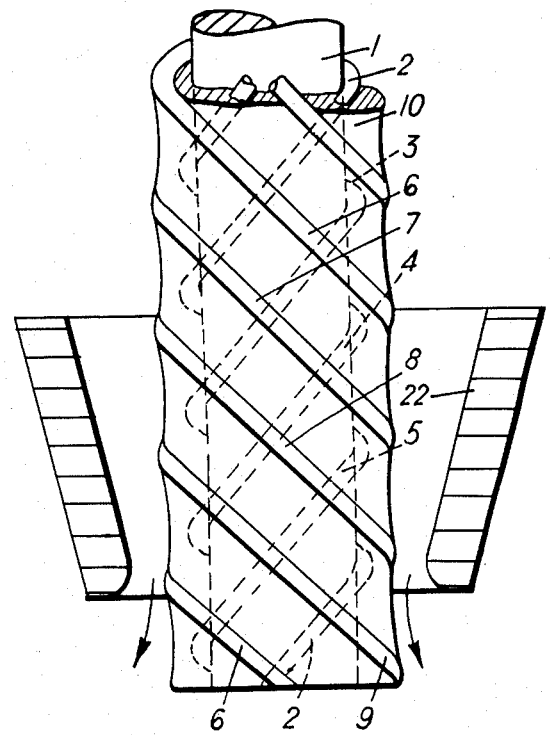
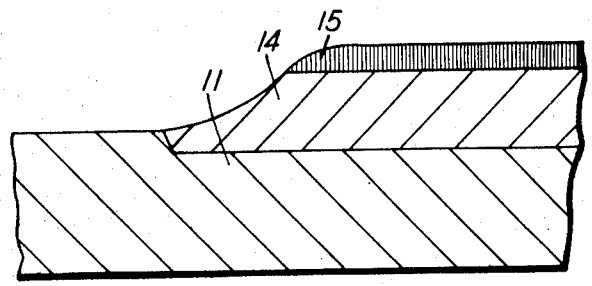
Inventor
WILLIAM EARL FREETH
ERIC JAMES MONTROSE MITCHELL
By
Aaron R. Townshend Attorney 3,221,136
METHOD AND ELECTRODE FOR ELECTRIC
ARC WELDING
William Earl Freeth, Kemsing, Sevenoaks, Kent, and Eric
James Montrose Mitchell, Wolverhampton, England,
assignors to The British Oxygen Company Limited, a
British company
Continuation of abandoned applications Ser. Nos. 661,660
and 661,666, May 27, 1957. This application July 7,
1961, Ser. No. 123,950
Claims priority, application Great Britain, May 29, 1956,
16,648/56
9 Claims. (Cl. 219—146)

The present invention relates to methods and electrodes for electric arc welding of ferrous materials, and this application is a continuation of our prior applications Serial No. 661,660 and Serial No. 661,666, each filed May 27, 1957, and both now abandoned.

In the welding of ferrous materials, electrodes having a core wire surrounded by so-called flux coatings have been employed for many years and a wide range of different coating composition has been used to provide a range of electrodes, each essentially suitable for welding specific materials under specified conditions, not only of current but also of position. Electrodes of the low hydrogen type having a coating composition containing a high proportion of "basic" materials, such for example as calcium fluoride have been found even at the high current densities used in automatic welding to deposit weld metal having good mechanical properties but such electrodes at high current densities have been found suitable only for welding in a substantially flat position. Additionally, when heavy deposits are made with such electrodes under normal conditions in one or more passes porosity may result in the deposited weld metal. On the other hand, electrodes having a coating containing a high proportion of rutile materials have been found more suitable for welding out of the flat position, in the horizontal/vertical fillet position for example, but unless the current density is severely restricted it has been found that the mechanical properties of weld metal laid down by such electrodes are relatively poor.

It is an object of the present invention to overcome these disadvantages of known arc welding methods using coated electrodes.

According to the broadest aspect of the present invention a method of electric arc welding ferrous material comprises establishing an electric arc between a workpiece of said material and a coated electrode having a core of ferrous material provided with a bonded coating of low hydrogen content containing fluxing material and deoxidising material, and in conjunction with the coated electrode supplying a gas consisting essentially of carbon dioxide to shield the arc and the welding zone from the atmosphere during welding, said coating acting as a barrier between the shielding gas and the core, and the materials of said coating functioning both to limit oxidation of the weld metal by the shielding gas and to produce a layer of slag on the deposited weld metal.

Known low hydrogen type welding electrodes usually deposit weld metal having a diffusible hydrogen content of less than 5 millilitres per hundred grams of weld metal, and usually of not more than one millilitre per hundred grams of weld metal. The electrode coatings in accordance with the present invention preferably contain a sufficiently low level of hydrogen to enable weld metal of this quality to be deposited.

By the term "gas consisting essentially of carbon dioxide" as used herein is meant a gas containing at least 80% by volume of carbon dioxide. Carbon monoxide, gaseous hydrocarbons, nitrogen or monotomic gases such as argon, or a small percentage of oxygen, may also be present either singularly or in admixture.

We have also found that if a welding electrode having a coating which is predominantly rutile in composition but contains a minor proportion of basic material and is manufactured so as to contain a minimum of residual hydrogen, is used in conjunction with a shield of carbon dioxide to exclude the atmosphere from the welding zone, and to reduce the concentration of residual hydrogen in the arc, weld metal having good mechanical properties can be deposited at high current density, and moreover, the welding position is not restricted to welding in a horizontal plane. A more restricted object of the present invention therefore is to enable the use at high welding currents of electrodes having coatings which are predominantly rutile in composition.

According to a more restricted aspect of the present invention, a method of electric arc welding ferrous material comprises establishing an electric arc between a workpiece of said material and a coated electrode having a core of ferrous material provided with a bonded coating of low hydrogen content comprising deoxidising and fluxing material and containing basic and rutile electrode covering materials, as herein defined, the weight of rutile material being at least 50% greater than the weight of basic material, and shielding the arc and the welding zone from the atmosphere during welding by a shield of a gas consisting essentially of carbon dioxide, said coating acting as a barrier between the shielding gas and the core, and the materials of said core functioning both to limit oxidation of the weld metal by the shielding gas and to produce a layer of slag on the deposited weld metal. We prefer the coating to contain between 65% and 20% by weight of rutile material.

The term "basic" is used herein as commonly applied to electrode coverings. For example calcium carbonate in one of its various forms, for instance, magnesium carbonate and other carbonates, calcium fluoride and other metal fluorides and mixtures of fluorides, for example cryolite, are "basic" in the accepted meaning of this term. Such materials are included in the coverings of Class 6 electrodes of British Standard No. 1719. In the art of manufacturing arc welding electrodes, such basic materials are contrasted with predominantly rutile materials which consist of oxides of titanium or minerals such for instance as ilmenite which contain a large proportion of titanium dioxide in association with other compounds. As zirconium silicate may be used in partial replacement of the oxides of titanium this material should be considered as a rutile material for the purpose of the present specification when used together with oxides of titanium in the coating.

A further more restricted object of the present invention is to overcome some of the disadvantages of electrodes having coatings of the low hydrogen type containing a high proportion of basic material. Thus we have found that if shielding gas consisting essentially of carbon dioxide is used in conjunction with such electrodes there is a reduction in the porosity which tends to occur with such electrodes when heavy deposits are made in one or more passes. In addition there is less tendency for porosity to occur at the beginning of a weld seam, and it is not so necessary to maintain a short arc during welding in order to avoid "long-arc" porosity. This type of porosity is aggravated as increasing alloying additions are made to the coating, but we have found that this tendency is considerably reduced when a shielding gas consisting essentially of carbon dioxide is used in conjunction with such electrodes.

According to a further more restricted aspect of the present invention, a method of electric arc welding ferrous material comprises establishing an electric arc between a workpiece of said material and a coated electrode having a core provided with a low hydrogen, bonded electrode coating containing between 15 and 60 parts by weight of basic material, between 10 and 30 parts by weight of felspar, and ferro-alloys between 15 and 20 parts by weight, and in conjunction with the coated electrode supplying from a source other than the electrode a gas consisting essentially of carbon dioxide to shield the arc and the welding zone from the atmosphere during welding.

It will be noted that the above mentioned range of coating compositions includes compositions containing approximately equal proportions of basic material, such as fluorspar, and rutile. The range also includes coating compositions having larger and smaller proportions of "basic" to rutile materials than this.

The present invention also includes coated welding electrodes intended for welding in accordance with these methods, these electrodes comprising a core wire surrounded by a flux coating of the low hydrogen type. After the coating composition has been applied to the core wire it is necessary that the coated electrode should be baked at a sufficiently high temperature to drive off free water which may be contained in silicate or other binders or in the minerals contained in the coating composition. The elimination of such water substantially reduces the hydrogen content of the coating composition and hence of the deposited weld metal.

This invention is especially applicable to coilable continuous electrodes intended for automatic or semi-automatic welding. It should be noted however that short lengths of welding electrode according to the invention may be coupled end to end to form a continuous electrode.

With flux-coated continuous electrodes it is necessary to conduct electric current from a contact member or members to the core wire as the electrode moves through a welding head. The contact with the core wire can, if desired, be made by one or more knife edges which penetrate through the coating as the electrode passes through the welding head but preferably the electrode is provided with a layer or layers of winding wire or wires in electrical contact with the core. The winding wire, or the outer winding wire where more than one layer is present, is exposed through the flux coating for contact with a contact member or members as the electrode passes through a welding head. A form of construction of mesh wound electrode as disclosed in the specification of United States Patent No. 2,432,048 is especially suitable, but other constructions having one or more layers of winding wires each consisting of one or more wires can be employed. The winding wires also facilitate retention of the coating composition on the electrode.

One construction of welding electrode of this type is illustrated in the accompanying drawing which shows diagrammatically the electrode being used to deposit a layer of weld metal on a workpiece by the method of the present invention.

Referring to the drawing, a continuous welding electrode consists of a core wire 1 surrounded by and in electrical contact with a wire mesh consisting of an inner layer formed by four parallel wires 2, 3, 4 and 5 wound helically about the core wire in a clockwise sense and an outer layer formed by four other parallel wires 6, 7, 8 and 9 wound helically about the inner layer in an anti-clockwise sense. The wires 6, 7, 8 and 9 extend to the surface of the electrode and are in electrical contact with the wires 2, 3, 4 and 5. The interstices between the wires of the two layers of mesh are filled with a coating material 10 the composition of which conforms with one of the examples set out below. The coating composition includes deoxidising and fluxing materials, and may contain metal powders, such as iron powder, and a small proportion of material such as clay to facilitate extrusion of the coating composition.

The welding electrode is arranged to be fed continuously by conventional means not shown through a nozzle 22 towards a workpiece 11, and conventional contact means not shown but arranged to contact the outer wires 6, 7, 8 and 9 are provided for feeding electric current to the welding electrode just above the nozzle 22 through the mesh to the core wire 1.

In operation an arc is struck between the welding electrode and the workpiece 11, and the welding electrode is fed continuously through the nozzle 22 towards the workpiece 11 to deposit a layer 14 of weld metal of the desired composition. Carbon dioxide is fed around the electrode through the nozzle 22 towards the workpiece 11 to flow around the welding electrode and shield the welding arc as indicated by the arrows. The flowing stream of shielding gas also provides protection for the welding zone from the surrounding atmosphere in the vicinity of the arc. The slag forming materials contained in the coating form a protective layer 15 on the top of the deposited weld metal 14, protecting the latter from contact with the atmosphere during cooling. By the use of one of the coating compositions specified in the examples below in conjunction with carbon dioxide shielding, very stable welding conditions are obtained together with smooth weld finish. Additionally, where the coating composition contains a substantial proportion of rutile, the method results in a slag deposit 15 which is easily detachable.

It will be appreciated that the construction of electrode used in practising the method of the present invention may be of any suitable kind. The winding wires, 2, 3, 4, 5, 6, 7, 8 and 9 may, for example, be omitted from the electrode shown in the drawing so that the electrode consists of a core wire 1 having a coating 10.

A number of examples of welding electrodes and coating compositions for use in practising the method of the present invention will now be described by way of example. In each case the electrode should be baked at a sufficiently high temperature substantially to dehydrate the coating if weld metal having the best mechanical properties is to be deposited.

Electrodes having a substantially larger proportion of rutile material than basic material, say 150% or more, are described in Examples 1 to 11, and these electrodes are particularly suited for use out of the flat position, in the horizontal-vertical fillet position for example, at high welding currents in conjunction with a separately supplied shield of carbon dioxide. The remaining examples relate to electrodes having coatings of a more basic character. The use of these electrodes in conjunction with a flowing shield of carbon dioxide provides operational advantages not obtained when known basic electrodes are used in the conventional manner.

EXAMPLE 1

A welding electrode as described above with reference to the accompanying drawing has a core wire 1 and two layers of wires, 2, 3, 4, 5, 6, 7, 8 and 9, all of mild steel. The coating composition 10 pressed into the intersticial spaces between the wires comprises a major proportion of rutile material and a minor proportion of basic material. The rutile material constitutes between 65% and 20% by weight of the composition and calcium fluoride (fluorspar) between 0.5% and 20% by weight. The composition also contains deoxidising materials, such for example as ferro-alloys, to an extent between 10% and 30% by weight. The composition can also include a slag-forming material such as felspar up to 30% by weight, and if desired metal powder, such as iron powder, may be added to increase the bulk of the metal contained in the electrode, so that it bears a suitable relationship to the amount of the rutile, basic and other materials contained in the coating composition. Such an electrode may be used for the welding of mild steels or low alloy steels.

EXAMPLE 2

A welding electrode generally as described in Example 1 above has a coating whose content of rutile material is between 50% and 30%, while the fluoride content is between 1% and 10%.

EXAMPLE 3

A welding electrode having a core wire which may, if desired, be provided with a surrounding wire mesh, is coated with a composition containing the following ingredients:

| | Percent by weight |
|---|---|
| Rutile | 45 |
| Fluorspar | 5 |
| Felspar | 15 |
| Ferro-manganese | 16 |
| Iron powder | 18.5 |
| Bentonite clay | 0.5 |

The purpose of the clay addition is to facilitate the extrusion operation by which the coating composition is applied to the electrode. The coating is baked at a temperature high enough substantially to dehydrate the coating.

We have found that weld metal deposited under a carbon dioxide shield by an electrode in accordance with Example 3 has mechanical properties, elongation in particular, which are comparable with those obtained using an electrode with a predominantly basic covering and similar current density, but without carbon dioxide shielding. The electrode in accordance with Example 3 was however found suitable for use in horizontal vertical fillet welding, whereas the electrode with a basic coating was suitable only for welding in the flat position.

EXAMPLE 4

An electrode for the welding of mild steel has a mild steel core wire surrounded by a mesh constituted by two layers of wires wound in opposite directions around the core wire. The wires forming the mesh are of mild steel. In the interstices of the mesh there is held a covering predominantly of the following compositions:

| | Parts by weight |
|---|---|
| Rutile | 45–60 |
| Fluorspar | 4–12 |
| Felspar | 12–24 |
| Ferro-manganese | 10–20 |

Iron powder may be added to obtain a suitable metal/flux ratio in the electrode.

The ferro-alloys may include up to 10 parts by weight of ferro-manganese and the balance may be ferro-silicon, ferro-aluminum, ferro-titanium and/or other deoxidising ferro-alloys.

EXAMPLE 5

In an electrode for welding low alloy steels such, for example as steels containing 1% chromium and 0.5% molybdenum, the electrode construction and coating may be as above described in Example 4 with the addition of ferro-chromium and ferro-molybdenum to the coating composition. For instance, between 5 and 10 parts by weight of ferro-chromium and about 2 parts by weight of ferro-molybdenum may be added to the materials mentioned in Example 4.

EXAMPLE 6

The most suitable coating composition will depend to some extent upon the conditions under which the work is to be welded. For instance, for welding mild steel at high currents of the order of say 800 amperes on an electrode having an 8 S.W.G. (.16 inch or 4.1 mm.) core wire in the flat position, an electrode having a mild steel core wire and mild steel wires wound about it to form a mesh may be used with a coating composition predominantly as follows:

| | Parts by weight |
|---|---|
| Rutile | 20–60 |
| Limestone | 0–20 |
| Fluorspar | 5–20 |
| Felspar | 0–30 |
| Clay | 0–5 |
| Ferro-alloy selected from (ferro-manganese) (ferro-silicon) (ferro-titanium) (ferro-aluminum) | 2–30 |

In addition other materials such for instance as iron powder, ferro-chromium, nickel or copper, and if desired materials to stabilize the arc by increasing emissivity or ionization such as carbonates of strontium or barium may also be added to the coating composition. If desired materials such as zirconium silicate or ilmenite can be used in partial replacement of rutile. If desired silica can be added.

EXAMPLE 6A

In a typical specific example given within the scope of Example 6 above the coating composition may be as follows:

| | Parts by weight |
|---|---|
| Rutile | 50 |
| Limestone | 8 |
| Fluorspar | 10 |
| Ferro-manganese | 16 |
| Ferro-silicon | 2 |
| Ferro-titanium | 2 |
| Felspar | 12 |
| (Preferably potassium felspar) | |
| Clay | Nil |

EXAMPLE 7

In an electrode for welding mild steel in the horizontal/vertical fillet welding position, the core wire and any winding wires may be of mild steel. The coating composition may be predominantly as follows:

| | Parts by weight |
|---|---|
| Rutile | 20–65 |
| Limestone | 1–10 |
| Fluorspar | 1–8 |
| Ferro-alloys | 2–30 |
| Felspar | 0–30 |
| Clay | 0–5 |

Additional materials may be added to the coating composition as mentioned in Example 6 above.

EXAMPLE 7A

A typical specific composition of coating material falling within Example 7 above is as follows:

| | Parts by weight |
|---|---|
| Rutile | 47 |
| Fluorspar | 5½ |
| Limestone | 5 |
| Ferro-manganese | 16 |
| Ferro-silicon | 2 |
| Felspar | 15 |
| (Preferably potassium) | |
| Clay | ¼ |

EXAMPLE 8

For the welding of a steel containing 4 to 6% chromium and 0.5% molybdenum an electrode having a core wire of mild steel and two layers of winding wires of similar material may be coated with a composition as follows:

| | Parts by weight |
|---|---|
| Rutile | 35 |
| Fluorspar | 10 |
| Limestone | 8 |
| Felspar | 12 |
| Clay | Nil |
| Ferro-manganese | 16 |
| Ferro-silicon | 2 |
| Ferro-titanium | 8 |
| Ferro-chromium | 22 |
| Ferro-molybdenum | 3 |

EXAMPLE 9

An electrode for depositing weld metal containing between 2 and 3% of nickel may have a mild steel core wire and mild steel winding wires as above mentioned. The core wire is coated with a composition containing the following ingredients:

| | Parts by weight |
|---|---|
| Rutile | 50 |
| Fluorspar | 10 |
| Limestone | 8 |
| Felspar | 12 |
| Clay | Nil |
| Nickel powder | 10 |
| Ferro-manganese | 15 |
| Ferro-silicon | 3 |

EXAMPLE 10

For depositing welding metal having a relatively high alloy content for example 14% manganese a major part of the alloying addition may be provided by the core wire. For example, a ferrous core wire containing 14% or more manganese may be used in conjunction with winding wires of mild steel in conjunction with coating compositions as described in Examples 6 and 7. It will be appreciated that if mild steel winding wires are used in conjunction with a core wire having approximately the composition of the weld metal desired it will be necessary to add alloying elements to the coating composition. The alloying element may be ferro-manganese for example.

EXAMPLE 11

For welding 18% chromium 8% nickel type austenitic corrosion resisting steels an electrode may have a core wire of a ferro-alloy containing 18% chromium and 8% nickel and inner and outer layers of winding wires of the same composition. Alternatively any or all of the wires may be of mild steel. The wires may include niobium. The coating composition may be as follows:

| | Parts by weight |
|---|---|
| Rutile | 20–50 |
| Fluorspar | 8–20 |
| Limestone | 5–20 |
| Felspar | 0–10 |
| Nickel powder | 5–10 |
| Ferro-niobium | 0–10 |
| Ferro-chromium | 10–25 |

EXAMPLE 11A

In a specific example within the scope of Example 11 the coating may be of the following composition:

| | Parts by weight |
|---|---|
| Rutile | 30 |
| Fluorspar | 10 |
| Limestone | 8 |
| Felspar | 5 |
| Ferro-chromium | 22 |
| Nickel powder | 6 |
| Ferro-niobium | 10 |

It will be noted that in the electrodes described in Examples 1 to 11 the coating contains a large proportion of rutile which may be in the form of the mineral rutile or may be contained in minerals including major amounts of titania. In addition it is preferred that the coating contains a minor proportion of calcium fluoride and other "basic" materials as hereinbefore defined together with a substantial amount of ferro-alloys acting as deoxidising agents. After the coating composition has been mixed with suitable binders to form a paste it is applied to the core wire and thereafter is baked to drive off excess water thereby reducing to a low value the amount of hydrogen contained in the welding electrode. When such electrodes are used in conjunction with a shield of a gas consisting essentially of carbon dioxide we have found that welds with excellent mechanical properties can be effected with very high currents which may, for example be of the order of 800 amperes applied to an 8 S.W.G. (.16 inch or 4.1 mm.) electrode resulting in a current density of about 40,000 amperes per square inch. Not only is the permissible current density substantially higher than has previously been found possible with electrodes having a predominantly rutile coating but also, despite the high current density, the weld metal has been found to be free from porosity and fissuring which may be caused by hydrogen dissolved in the weld metal.

We have found that using electrodes in accordance with Examples 1 to 11 there is produced during welding appreciably less fume and that the fume is less objectionable to the welding operator than the fume produced by typical "basic" electrodes, the coating of which may contain a comparatively large proportion of fluorspar. A further advantage of these electrodes is that they can be used for welding out of the flat position, in the horizontal/vertical fillet position for example.

EXAMPLE 12

An electrode for the automatic welding of mild steel has a mild steel core wire surrounded by a mesh constituted by two layers of wires wound in opposite directions around the core wire. The wires forming the mesh are of mild steel. In the interstices of the mesh there is held a covering of the following composition:

| | Parts by weight |
|---|---|
| Rutile | 50–30 |
| Limestone | 0–15 |
| Fluorspar | 5–20 |
| Felspar | 10–25 |
| Ferro-alloys | 15–20 |

Iron powder may be added to obtain a suitable metal/flux ratio in the electrode. The ferro-alloys may include up to 15 parts by weight of ferro-manganese and the balance may be ferro-silicon, ferro-aluminum, ferro-titanium and/or other deoxidising ferro-alloys.

EXAMPLE 12A

In an electrode within the scope of Example 12 above, the coating contains the following ingredients:

| | Parts by weight |
|---|---|
| Rutile | 40 |
| Limestone | 10 |
| Fluorspar | 15 |
| Felspar | 15 |
| Ferro-alloys | 18 |

The ferro-alloys may comprise ferro-manganese 15 parts by weight and ferro-silicon 3 parts by weight. If desired, some of the ferro-silicon can be replaced by ferro-titanium and/or ferro-aluminum.

EXAMPLE 13

An electrode intended for the welding of mild steel has a mild steel core wire surrounded by a wire mesh consisting of two layers of mild steel wires wound in opposite directions. The layers forming the mesh may have one or more wires in each layer. The interstices of the mesh are filled with a coating having the following composition:

| | Parts by weight |
|---|---|
| Rutile | 30–0 |
| Fluorspar | 20–40 |
| Limestone | 0–10 |
| Felspar | 0–30 |
| Ferro-alloys | 10–30 |
| Bentonite clay | 0–5 |

The ferro-alloys comprise ferro-manganese 10 to 20 parts by weight and 0 to 10 parts by weight of other ferro-alloy deoxidising agents such, for example, as ferro-silicon, ferro-titanium and ferro-aluminum.

EXAMPLE 13A

In an electrode in accordance with Example 13 the composition of the coating may lie within the following range:

| | Parts by weight |
|---|---|
| Rutile | 30–20 |
| Fluorspar | 25–30 |
| Limestone | 0–10 |
| Felspar | 20–30 |
| Ferro-manganese | 15–20 |
| Ferro-silicon | 0–3 |
| Bentonite clay | 0–2 |

EXAMPLE 13B

In an electrode in accordance with Examples 13 and 13A the coating may have the following composition:

| | Parts by weight |
|---|---|
| Rutile | 20 |
| Fluorspar | 20 |
| Limestone | 10 |
| Felspar | 30 |
| Low-carbon ferro-manganese | 18 |
| Ferro-silicon | 1 |
| Bentonite | 1 |

EXAMPLE 14

An electrode intended for the welding of mild steel has a mild steel core wire surrounded by a wire mesh consisting of two layers of mild steel wires wound in opposite directions. The layers forming the mesh may have one or more wires in each layer. The interstices of the mesh are filled with a coating having the following composition:

| | Parts by weight |
|---|---|
| Fluorspar | 40–60 |
| Limestone | 0–10 |
| Felspar | 20–40 |
| Ferro-alloys | 10–30 |
| Bentonite clay | 0–5 |

Where both fluorspar and limestone are used the upper limit for these two ingredients taken together is 60 parts by weight.

The ferro-alloys comprise ferro-manganese 10 to 20 parts by weight and 0 to 10 parts by weight of other ferro-alloy deoxidising agents such, for example, as ferro-silicon, ferro-titanium and ferro-aluminum.

EXAMPLE 14A

The coating composition in an electrode in accordance with Example 14 may have a composition falling within the following ranges:

| | Parts by weight |
|---|---|
| Fluorspar | 45–55 |
| Limestone | 0–10 |
| Felspar | 25–35 |
| Ferro-manganese | 15–20 |
| Ferro-silicon | 0–3 |
| Bentonite clay | 0–2 |

Where both fluorspar and limestone are used together the upper limit for these two ingredients taken together is 60 parts by weight.

EXAMPLE 14B

A particular coating composition falling within Examples 14 and 14A may have the following composition:

| | Parts by weight |
|---|---|
| Fluorspar | 50 |
| Limestone | 6 |
| Felspar | 20 |
| Pontspar | 6 |
| Low-carbon ferro-manganese | 16 |
| Ferro-silicon | 2 |

Pontspar is a mineral containing a mixture of felspar and clay.

EXAMPLE 15

An electrode for the automatic welding of mild steel has a mild steel core wire surrounded by a mesh constituted by two layers of wires wound in opposite directions around the core wire. The wires forming the mesh are of mild steel. In the interstices of the mesh there is held a covering of the following composition:

| | Parts by weight |
|---|---|
| Rutile | 10–0 |
| Limestone | 0–10 |
| Fluorspar | 40–60 |
| Felspar | 20–40 |
| Ferro-alloys | 10–20 |
| Clay | 0–5 |

EXAMPLE 15A

In an electrode for welding mild steel coming within the scope of Example 15 above the coating may have the following composition:

| | Parts by weight |
|---|---|
| Rutile | 5 |
| Limestone | 8 |
| Fluorspar | 43 |
| Felspar | 23 |
| Ferro-manganese | 13 |
| Ferro-silicon | 2 |
| Ferro-aluminum | 2 |

EXAMPLE 16

A method in accordance with the present invention may be used for the welding of low-alloy type steels such, for example, as creep resistant steels. Typical steels of this type have low-carbon contents—in general less than 0.15%—and may contain up to about 10% of alloying elements such, for instance, as molybdenum chromium and/or nickel. Known steels of this type have the following proportions of major alloying ingredients:

(a) 0.5% molybdenum
(b) 1% chromium 0.5% molybdenum
(c) 2–2.5% chromium 1.0% molybdenum
(d) 4–6% chromium 0.5% molybdenum
(e) 3–5% nickel It is particularly to be noted that for the welding of this type of steel it is necessary to ensure low-carbon content in the deposited weld metal in order to obtain correct mechanical and metallurgical properties.

For the welding of a creep resistant steel an electrode may comprise a low-carbon mild steel core wire surrounded by a mesh constituted by two layers of low-carbon mild steel wires wound in opposite directions around the core wire. In the interstices of the mesh there is held a covering of the following composition:

| | Parts by weight |
|---|---|
| Rutile | 40–20 |
| Basic material | 20–35 |
| Felspar | 10–25 |
| Ferro-alloys | 15–30 |
| Clay | 0–10 |

At least a substantial proportion of the ferro-alloys are of the low-carbon type. For example, the ferro-alloys may include 10 to 15 parts by weight of low-carbon ferro-manganese. The basic materials above referred to may include fluorspar if desired in admixture with carbonates such as calcium carbonate up to 20 parts by weight of the total basic material.

EXAMPLE 16A

In an electrode for welding a creep resistant steel containing 1% chromium and 0.5% molybdenum and coming within the scope of Example 16 the coating may have the following composition:

| | Parts by weight |
|---|---|
| Rutile | 30 |
| Fluorspar | 25 |
| Limestone | 5 |
| Felspar | 20 |
| Low-carbon ferro-manganese | 12 |
| Low-carbon ferro-chromium | 7 |
| Ferro-molybdenum | 3 |
| Ferro-silicon | 3 |

EXAMPLE 17

In an electrode for welding low carbon steels, for example, of the types mentioned in Example 16 above, the electrode may have a core with a surrounding mesh as described in Example 16. A more basic coating having the following composition may be used:

| | Parts by weight |
|---|---|
| Rutile | 0–20 |
| Basic material | 35–60 |
| Felspar | 20–35 |
| Ferro-alloys | 15–30 |
| Clay | 0–10 |

EXAMPLE 17A

In a specific example within the scope of Example 17 above the coating may have the following composition:

| | Parts by weight |
|---|---|
| Rutile | 5 |
| Fluorspar | 46 |
| Limestone | 4 |
| Felspar | 20 |
| Low-carbon ferro-manganese | 12 |
| Low-carbon ferro-chromium | 7 |
| Ferro-molybdenum | 3 |
| Ferro-silicon | 3 |

We claim:

1. A welding electrode having a core wire of mild steel surrounded by a low hydrogen, bonded, coating having a composition within the following ranges:

| | Parts by weight |
|---|---|
| Rutile | between 50 and 30 |
| Limestone | between 0 and 15 |
| Fluorspar | between 5 and 20 |
| Felspar | between 10 and 25 |
| Ferro-alloys | between 15 and 20 |

2. A welding electrode for the welding of mild steel comprising a ferrous core, a wire wound around and in electrical contact with the core and extending to the surface of the electrode whereby electric current may be conducted to the core, and a low hydrogen coating on the core having the following composition by weight:

| | Parts |
|---|---|
| Rutile | 45–60 |
| Fluorspar | 4–12 |
| Felspar | 12–24 |
| Ferro-manganese | 10–20 |

3. A method of electric arc welding ferrous material which comprises establishing an electric arc between a workpiece of said material and a coated electrode having a core of ferrous material provided with a bonded coating of low hydrogen content comprising, by weight: rutile 45–60 parts; fluorspar 4–12 parts; felspar 12–24 parts; ferro-manganese 10–20 parts; and shielding the arc and the welding zone from the atmosphere during welding by a shield of a gas consisting essentially of carbon dioxide, said coating acting as a barrier between the shielding gas and the core, and the materials of said core functioning to limit oxidation of the weld metal by the shielding gas and to produce a layer of slag on the deposited weld metal.

4. A method of electric arc welding ferrous material which comprises establishing an electric arc between a workpiece of said material and a coated electrode having a core of ferrous material provided with a bonding coating of low hydrogen content comprising, by weight: rutile 45%; fluorspar 5%; felspar 15%; ferro-manganese 16%; iron powder 18.5%; bentonite clay 0.5%; and shielding the arc and the welding zone from the atmosphere during welding by a shield of a gas consisting essentially of carbon dioxide, said coating acting as a barrier between the shielding gas and the core, and the materials of said core functioning to limit oxidation of the weld metal by the shielding gas and to produce a layer of slag on the deposited weld metal.

5. A welding electrode comprising a core of ferrous material, at least one wire wound around and in electrical contact with the core and extending to the surface of the electrode whereby electric current may be conducted to the core, and a low hydrogen coating on the core comprising, by weight: rutile 45%; fluorspar 5%; felspar 15%; ferro-manganese 16%; iron powder 18.5%; bentonite clay 0.5%.

6. A method of electric arc welding ferrous material which comprises establishing an electric arc between a workpiece of said material and a coated electrode having a core of ferrous material provided with a bonded coating of low hydrogen content comprising, by weight: rutile 20–60 parts; limestone 0–20 parts; fluorspar 5–20 parts; felspar 0–30 parts; clay 0–5 parts; ferro-alloy 2–30 parts selected from (ferro-manganese), (ferro-silicon), (ferro-titanium), (ferro-aluminum), and shielding the arc and the welding zone from the atmosphere during welding by a shield of a gas consisting essentially of carbon dioxide, said coating acting as a barrier between the shielding gas and the core, and the materials of said core functioning to limit oxidation of the weld metal by the shielding gas and to produce a layer of slag on the deposited weld metal.

7. A method of electric arc welding ferrous material which comprises establishing an electric arc between a workpiece of said material and a coated electrode having a core of ferrous material provided with a bonded coating of low hydrogen content comprising, by weight: rutile 45–60 parts; fluorspar 4–12 parts; felspar 12–24 parts; ferro-manganese 10–20 parts; iron powder 2–30 parts; and shielding the arc and the welding zone from the atmosphere during welding by a shield of a gas consisting essentially of carbon dioxide, said coating acting as a barrier between the shielding gas and the core, and the materials of said core functioning both to limit oxidation of the weld metal by the shielding gas and to produce a layer of slag on the deposited weld metal.

8. A method of electric arc welding ferrous material which comprises establishing an electric arc between a workpiece of said material and a coated electrode having a core of ferrous material provided with a bonded coating of low hydrogen content comprising, by weight: rutile 20–50 parts; fluorspar 8–20 parts; limestone 5–20 parts; felspar 0–10 parts; nickel powder 5–10 parts; ferro-niobium 0–10 parts; ferro-chromium 10–25 parts; and shielding the arc and the welding zone from the atmosphere during welding by a shield of a gas consisting essentially of carbon dioxide, said coating acting as a barrier between the shielding gas and the core, and the materials of said core functioning to limit oxidation of the weld metal by the shielding gas and to produce a layer of slag on the deposited weld metal.

9. A welding electrode comprising a core of ferrous material, at least one wire wound around and in electrical contact with the core and extending to the surface of the electrode whereby electric current may be conducted to the core, and a low hydrogen coating on the core comprising, by weight: rutile 45%; fluorspar up to 20%; felspar up to 30%; and a ferro-alloy of at least 2%.

References Cited by the Examiner
UNITED STATES PATENTS

| | | | |
|---|---|---|---|
| 2,432,048 | 12/1947 | Stretton | 219—146 |
| 2,920,181 | 1/1960 | Rockefeller et al. | 219—74 |
| 2,947,847 | 8/1960 | Craig et al. | 219—74 |
| 2,951,931 | 9/1960 | Danhier | 219—74 |
| 3,023,301 | 2/1962 | Claussen | 219—74 |

RICHARD M. WOOD, *Primary Examiner.*

MAX L. LEVY, JOSEPH V. TRUHE, *Examiners.*